(12) United States Patent
Matsumoto et al.

(10) Patent No.: US 8,957,349 B2
(45) Date of Patent: Feb. 17, 2015

(54) LASER MACHINING DEVICE AND LASER MACHINING METHOD

(75) Inventors: Naoya Matsumoto, Hamamatsu (JP); Norihiro Fukuchi, Hamamatsu (JP); Naohisa Mukozaka, Hamamatsu (JP); Takashi Inoue, Hamamatsu (JP); Yuu Takiguchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1416 days.

(21) Appl. No.: 12/496,249

(22) Filed: Jul. 1, 2009

(65) Prior Publication Data
US 2010/0000978 A1 Jan. 7, 2010

(30) Foreign Application Priority Data
Jul. 3, 2008 (JP) ................. P2008-174999

(51) Int. Cl.
| | |
|---|---|
| *B23K 26/00* | (2014.01) |
| *B41J 2/44* | (2006.01) |
| *B23K 26/06* | (2014.01) |
| *B41J 2/465* | (2006.01) |
| *G02B 26/06* | (2006.01) |
| *G02B 27/42* | (2006.01) |

(Continued)

(52) U.S. Cl.
CPC .............. *B41J 2/442* (2013.01); *B23K 26/0656* (2013.01); *B41J 2/465* (2013.01); *G02B 26/06* (2013.01); *G02B 27/42* (2013.01); *G02B 27/4244* (2013.01); *G03H 1/0005* (2013.01); *G03H 1/08* (2013.01); *B41M 5/24* (2013.01); *G02B 27/425* (2013.01); *G03H 1/0236* (2013.01); *G03H 1/2294* (2013.01); *G03H 2001/0094* (2013.01); *G03H 2001/2218* (2013.01); *G03H 2210/52* (2013.01); *G03H 2225/32* (2013.01)
USPC .............. 219/121.72; 219/121.6; 219/121.67; 250/201.9; 250/208.1

(58) Field of Classification Search
USPC .......... 219/121.6, 121.67, 121.72; 250/201.9, 250/208.1
See application file for complete search history.

(56) References Cited

U.S. PATENT DOCUMENTS

| | | | | |
|---|---|---|---|---|
| 5,675,437 A | * | 10/1997 | Hart et al. ..................... | 359/566 |
| 6,008,914 A | * | 12/1999 | Sasagawa et al. ............... | 359/15 |

(Continued)

FOREIGN PATENT DOCUMENTS

| | | |
|---|---|---|
| CN | 1473087 | 2/2004 |
| EP | 0540759 | 4/1994 |

(Continued)

*Primary Examiner* — Henry Yuen
*Assistant Examiner* — Ayub Maye
(74) *Attorney, Agent, or Firm* — Drinker Biddle & Reath LLP (57) ABSTRACT

A laser machining device is provided with a laser light source, a spatial light modulator, a driving unit, a control unit, and a condensing optical system. The control unit selects a basic hologram corresponding to each basic machining pattern included in a whole machining pattern in a workpiece from a plurality of basic holograms stored by the storage unit, and determines a display region of the basic hologram in the spatial light modulator so that the deviation of the value of "Iη/n" becomes small for the selected respective basic hologram when the intensity of a laser beam input to a display region of the basic hologram in the spatial light modulator is defined as I, the diffraction efficiency of the laser beam in the basic hologram is defined as η, and the number of condensing points in a basic machining pattern corresponding to the basic hologram is defined as n.

20 Claims, 10 Drawing Sheets

(51) Int. Cl.
  *G03H 1/00*   (2006.01)
  *G03H 1/08*   (2006.01)
  *B41M 5/24*   (2006.01)
  *G03H 1/02*   (2006.01)
  *G03H 1/22*   (2006.01)

(56) References Cited

U.S. PATENT DOCUMENTS

| 7,910,869 B2 * | 3/2011 | Seo et al. | 250/201.9 |
| 2003/0051440 A1 * | 3/2003 | Chow et al. | 53/412 |
| 2005/0018259 A1 | 1/2005 | Holmes | |
| 2005/0088545 A1 * | 4/2005 | Ito | 348/239 |
| 2005/0185230 A1 * | 8/2005 | Kuroda et al. | 359/3 |
| 2009/0147330 A1 * | 6/2009 | Seo et al. | 359/11 |
| 2012/0080527 A1 * | 4/2012 | Finn | 235/492 |

FOREIGN PATENT DOCUMENTS

| JP | S64-042245 | 2/1989 |
| JP | H6-208088 | 7/1994 |
| JP | 3475947 | 9/2003 |
| JP | 2006-113185 | 4/2006 |
| WO | WO 92/21050 | 11/1992 |
| WO | WO 2006/041191 | 4/2006 |
| WO | WO 2006041191 A1 * | 4/2006 |

* cited by examiner

LASER MACHINING DEVICE AND LASER MACHINING METHOD

BACKGROUND OF THE INVENTION

1. Field of the Invention

The present invention relates to a device and method which radiates a laser beam onto a workpiece to machine this workpiece.

2. Related Background Art

Conventionally, ink has been used when stamping the date of manufacture and a serial number on, for example, a can or the like. However, in a case where ink is used, there are problems regarding ink peeling and pollution of the environment. As a method of solving these problems, marking by laser machining is attracting attention. In the laser marking, fine holes are formed in a workpiece, such as a can, and alphanumeric characters or the like are stamped thereon by condensing and radiating a laser beam.

As machining methods for laser marking, both a method of forming dots one by one using one laser beam and a method of arranging an intensity mask on an extended laser beam to perform collective machining have been generally used in the past. However, in the former method, dots are formed one by one. Thus, there is a problem in that it is time-consuming. Additionally, in the latter method, the laser beam intercepted by the intensity mask did not contribute to the machining. Thus, there is a problem in that the quantity of light lost is large.

As a method of solving these problems, a method using a phase-modulation type spatial light modulator has started to be considered. That is, a hologram is displayed to the phase-modulation type spatial light modulator, a laser beam input to this spatial light modulator is phase-modulated for each pixel, the laser beam after that phase modulation is Fourier-transformed by a condensing optical system and imaged on a workpiece, and the workpiece is machined according to a machining pattern created by this imaging. A hologram according to a machining pattern in a workpiece is used as the hologram displayed to the spatial light modulator. This can reduce light loss and collectively form multi-points in a workpiece.

In the laser machining method using the phase-modulation type spatial light modulator in this way, first, the desired machining pattern in a workpiece is determined, calculation is performed on the basis of this machining pattern to create a hologram, this created hologram is transmitted to a driving unit of a spatial light modulator, the spatial light modulator is made to display the hologram by this driving unit, and a laser beam is then made to be incident on the spatial light modulator (refer to Japanese Patent No. 3475947).

Meanwhile, it is necessary to perform marking in real time on each of a number of workpieces which travel sequentially, for example, on a line. In a case where numeric values from "0001" to "1000" are marked on 1000 workpieces, respectively, as serial numbers, a series of procedures including machining pattern determination, hologram creation, and hologram transmission are repeatedly performed 1000 times when the above laser machining method is used.

However, in the above laser machining method, the time required for the series of procedures including machining pattern determination, hologram creation, and hologram transmission is long. Thus, in a case where marking is sequentially marked in real time on a number of workpieces respectively as described above, the throughput of laser machining is low.

SUMMARY OF THE INVENTION

As a method of solving the problem of the throughput of laser machining as described above, a plurality of basic holograms are created in advance and stored in correspondence to basic machining patterns (for example, alphanumeric characters), respectively, some of the basic holograms are combined to configure a whole hologram, the spatial light modulator is caused to display the configured whole hologram, and a laser beam is phase-modulated for each pixel by the spatial light modulator to generate a whole machining pattern (for example, a character string composed of a plurality of alphanumeric characters) constituted by some basic machining patterns in the workpiece. Since this makes unnecessary at least the respective processings of the above hologram creation, improvement of the throughput of laser machining can be expected.

However, in a case where the whole machining pattern constituted by some basic machining patterns as described above is generated in a workpiece, the inventors have noted the following problem. That is, the machining depth varies according to the basic machining patterns included in the whole machining pattern, and even if the machining depth is proper for a certain basic machining pattern, the machining depth may become too large or too small for other basic machining patterns. Therefore, the quality of laser machining on the workpiece according to the whole machining pattern may be bad.

The invention was made in order to solve the above problems, and the object thereof is to provide a laser machining device and a laser machining method capable of performing high-quality laser machining with high throughput.

The laser machining device according to the invention is a laser machining device which radiates a laser beam onto a workpiece, thereby machining the workpiece collectively in a whole machining pattern including two or more basic machining patterns. The laser machining device includes (1) a laser light source which outputs a laser beam, (2) a phase-modulation type spatial light modulator which inputs the laser beam output from the laser light source, displays a whole hologram which modulates the phase of the laser beam in each of a plurality of pixels which is two-dimensionally arrayed, and outputs the laser beam after the phase modulation, (3) a condensing optical system which inputs the laser beam output from the spatial light modulator, and images the laser beam in the workpiece, (4) a storage unit which stores a plurality of basic holograms to be displayed to the spatial light modulator in correspondence with a plurality of basic machining patterns, respectively, and (5) a control unit which configures a whole hologram on the basis of a basic hologram selected from the plurality of basic holograms stored by the storage unit, and causes the spatial light modulator to display the configured whole hologram.

Also, the control unit included in the laser machining device according to the invention (a) selects a basic hologram corresponding to each basic machining pattern included in the whole machining pattern in the workpiece from the plurality of basic holograms stored by the storage unit, (b) determines a display region of each basic hologram in the spatial light modulator so that the deviation of the value of "Iη/n" becomes small for the selected respective basic hologram when the intensity of a laser beam input to a display region of the basic hologram in the spatial light modulator is defined as I, the diffraction efficiency of the laser beam in the basic hologram is defined as η, and the number of condensing points in a basic machining pattern corresponding to the basic hologram is defined as n, and (c) superimposes a grating on each basic hologram to configure a whole hologram and causes the spatial light modulator to display the configured whole hologram so that the condensing optical system images a laser beam on an imaging area of a corresponding basic machining pattern in the workpiece from the determined display region of each basic hologram in the spatial light modulator.

Additionally, the laser machining method according to the invention is a laser machining method which radiates a laser beam onto a workpiece, thereby machining the workpiece collectively in a whole machining pattern including two or more basic machining patterns, and which uses the laser machining device including the laser light source, the spatial light modulator, the condensing optical system, and the storage unit as described above. Also, the laser machining method according to the invention includes (a) selecting a basic hologram corresponding to each basic machining pattern included in the whole machining pattern in the workpiece from the plurality of basic holograms stored by the storage unit, (b) determining a display region of each basic hologram in the spatial light modulator so that the deviation of the value of "$I\eta/n$" becomes small for the selected respective basic hologram when the intensity of a laser beam input to a display region of the basic hologram in the spatial light modulator is defined as I, the diffraction efficiency of the laser beam in the basic hologram is defined as $\eta$, and the number of condensing points in a basic machining pattern corresponding to the basic hologram is defined as n, and (c) superimposing a grating on each basic hologram to configure a whole hologram, and the method causes the spatial light modulator to display the configured whole hologram so that the condensing optical system images a laser beam on an imaging area of a corresponding basic machining pattern in the workpiece from the determined display region of each basic hologram in the spatial light modulator.

According to the invention, high-quality laser machining can be performed with high throughput.

DESCRIPTION OF THE PREFERRED EMBODIMENTS

Hereinafter, the best modes for carrying out the invention will be described in detail with reference to the accompanying drawings. In addition, in the description of the drawings, the same reference numerals will be given to the same elements, and duplicate description will be omitted.

Figure 1:
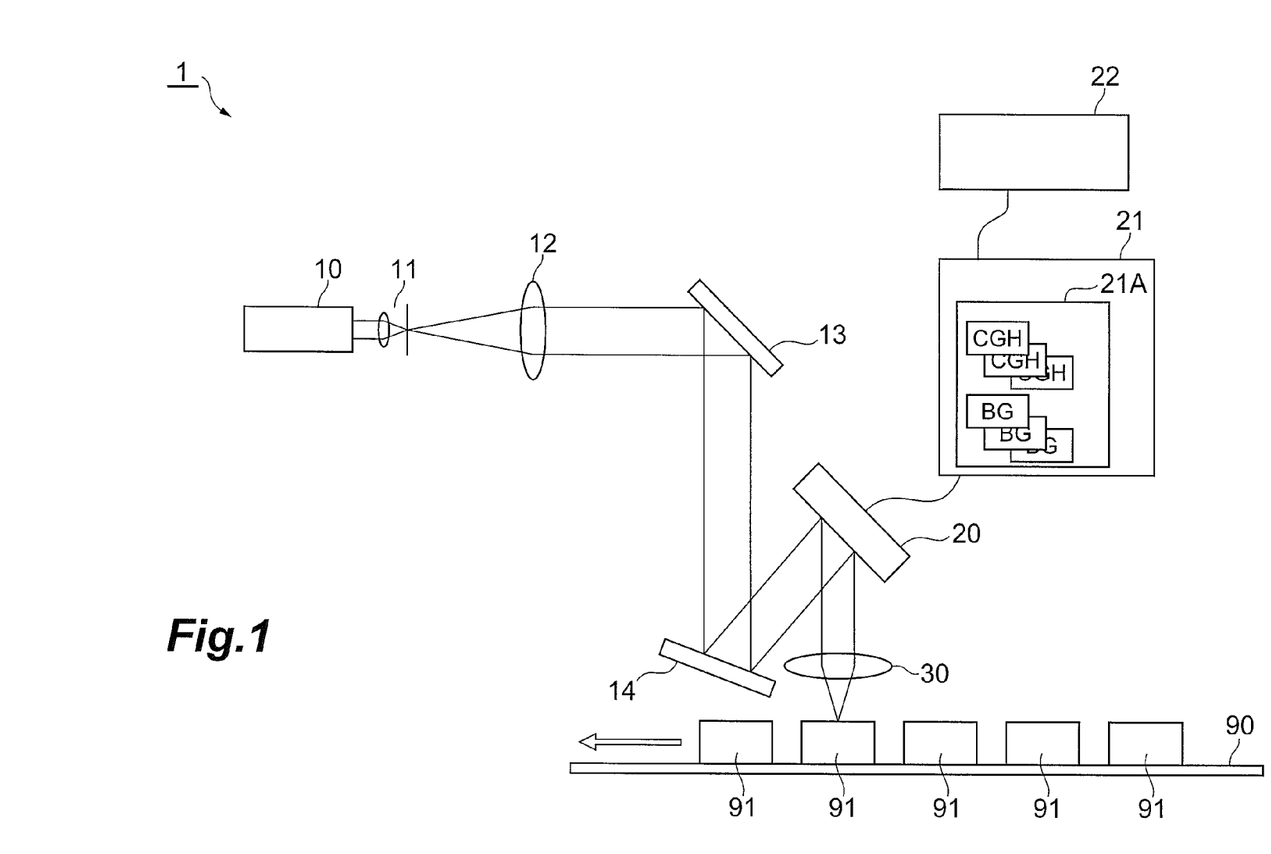
FIG. 1 is a view showing the configuration of a laser machining device 1 according to this embodiment.

FIG. 1 is a view showing the configuration of a laser machining device 1 according to this embodiment. The laser machining device 1 shown in this drawing is a device which can be suitably used to sequentially condense and radiate a laser beam onto a plurality of workpieces 91, which is moving on a line 90, to thereby perform laser machining, such as marking, and is provided with a laser light source 10, a spatial filter 11, a collimating lens 12, a mirror 13, a mirror 14, a spatial light modulator 20, a driving unit 21, a control unit 22, and a condensing optical system 30.

The laser light source 10 is a light source which outputs a laser beam to be radiated onto a workpiece 91, and preferably, a light source, such as a femtosecond laser light source, an Nd:YAG laser light source, or an Nd:YLF laser light source and a ultraviolet laser, which outputs a pulse laser beam. After the laser beam output from the laser light source 10 passes through the spatial filter 11, it is collimated by the collimating lens 12, reflected by the mirror 13 and the mirror 14, and input to the spatial light modulator 20.

The spatial light modulator 20 is of a phase modulation type which inputs a laser beam output from the laser light source 10 and displays a hologram which modulates the phase of the laser beam in each of a plurality of pixels which is two-dimensionally arrayed, thereby outputting the laser beam after the phase modulation. It is preferable that the phase hologram displayed in the spatial light modulator 20 be a hologram (CGH: Computer Generated Hologram) obtained by numerical calculation.

The spatial light modulator 20 may be a reflective one, and may be a transmissive one. The reflective spatial light modulator 20 may be any of a LCOS (Liquid Crystal on Silicon) type, a MEMS (Micro Electro Mechanical Systems) type, and an optical address type. Additionally, the transmissive spatial light modulator 20 may be an LCD (Liquid Crystal Display) or the like. The reflective spatial light modulator is shown as the spatial light modulator 20 in FIG. 1.

The driving unit 21 sets the amount of phase modulation in each of a plurality of two-dimensionally arrayed pixels of the spatial light modulator 20, and gives a signal for setting the amount of phase modulation of each pixel to the spatial light modulator 20. The driving unit 21 sets the amount of phase modulation in each of a plurality of two-dimensionally arrayed pixels of the spatial light modulator 20, thereby causing the spatial light modulator 20 to display a hologram.

The condensing optical system 30 is provided at the subsequent stage of the spatial light modulator 20 to input a laser beam which is phase-modulated and output for each pixel in the spatial light modulator 20. Especially, the condensing optical system 30 includes a lens which Fourier-transforms the laser beam output from the spatial light modulator 20. The Fourier transformed image is formed on a back focal plane of the Fourier transform lens.

The control unit 22 is constituted by, for example, a PC, and controls the operation of the driving unit 21, thereby causing a hologram to be written from the driving unit 21 to the spatial light modulator 20. At this time, the control unit 22 causes the spatial light modulator 20 to display a hologram which causes the laser beam output from the spatial light modulator 20 to be condensed at a plurality of condensing positions by the condensing optical system 30.

In particular, the laser machining device 1 according to this embodiment radiates a laser beam output from the laser light source 10 and phase-modulated by the spatial light modulator 20 onto the workpiece 91, thereby machining the workpiece 91 collectively in a whole machining pattern including two or more basic machining patterns. Therefore, the driving unit 21 has a storage unit 21A which stores a plurality of basic holograms to be displayed to the spatial light modulator 20 so as to correspond to the plurality of basic machining patterns, respectively. The control unit 22 configures a whole hologram on the basis of a basic hologram selected from the plurality of basic holograms stored in the storage unit 21A, and causes the spatial light modulator 20 to display the configured whole hologram.

For example, the basic machining pattern is an alphanumeric character, and a whole machining pattern is a character string in which a plurality of basic machining patterns (alphanumeric characters) is one-dimensionally or two-dimensionally arrayed. The basic hologram is generated in advance in correspondence with the basic machining pattern, and is stored by the storage unit 21A. The whole hologram is configured on the basis of the basic hologram. When a laser beam is incident on and phase-modulated in the spatial light modulator 20 to which this whole hologram has been displayed, and the laser beam after the phase modulation is radiated onto the workpiece 91 through the condensing optical system 30, a whole machining pattern constituted by some basic machining patterns is generated in the workpiece 91.

In more detail, the control unit 22 included in the laser machining device 1 according to this embodiment performs the following control on the driving unit 21 and the storage unit 21A. That is, the control unit 22 selects a basic hologram corresponding to each basic machining pattern included in the whole machining pattern in the workpiece 91 from the plurality of basic holograms stored by the storage unit 21A. Next, the control unit 22 determines a display region of the basic hologram in the spatial light modulator 20 so that the deviation of the value of "$I\eta/n$" becomes small for the selected respective basic hologram when the intensity of a laser beam input to a display region of the basic hologram in the spatial light modulator 20 is defined as I, the diffraction efficiency of the laser beam in the basic hologram is defined as $\eta$, and the number of condensing points in a basic machining pattern corresponding to the basic hologram is defined as n. Also, the control unit 22 superimposes a grating on each basic hologram to configure a whole hologram and causes the spatial light modulator 20 to display the configured whole hologram so that the condensing optical system 30 images a laser beam on an imaging area of a corresponding basic machining pattern in the workpiece 91 from the determined display region of each basic hologram in the spatial light modulator 20.

Figure 2:
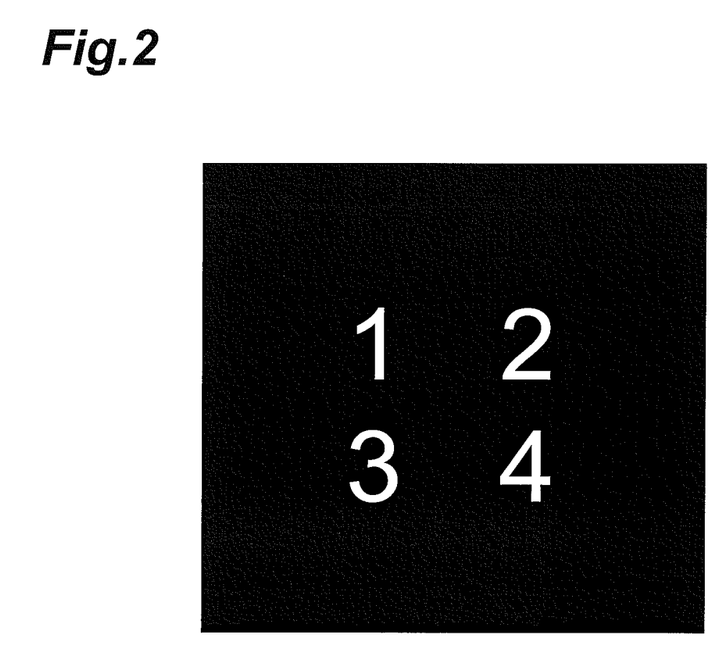
FIG. 2 is a view showing an example of a pattern to be marked in a workpiece 91.
Figure 3:
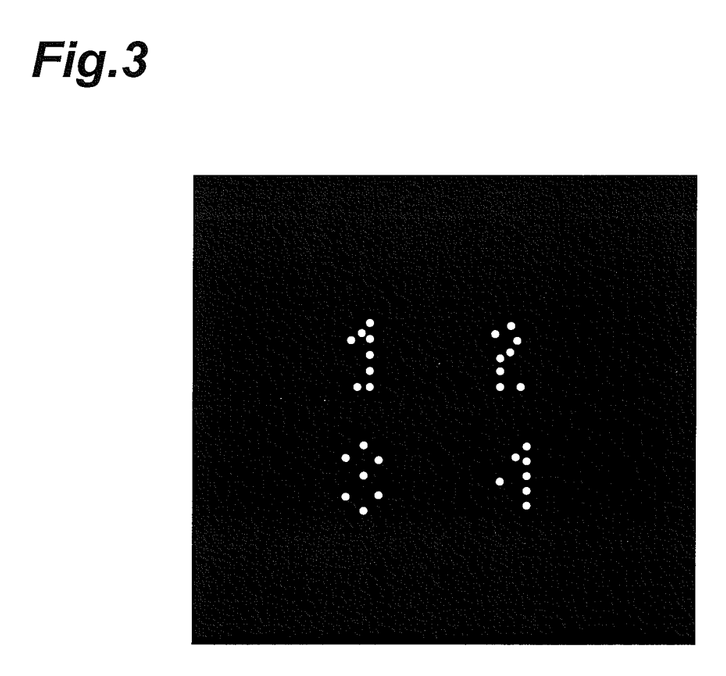
FIG. 3 is a view showing an example of a whole machining pattern to be formed in the workpiece 91 by the laser machining device 1 or laser machining method according to this embodiment.

In the following, a case where the whole machining pattern as shown in FIG. 2 is constituted by four basic machining patterns will be supposed and described in more detail. FIG. 2 is a view showing an example of a pattern to be marked in a workpiece 91. FIG. 3 is a view showing an example of a whole machining pattern to be formed in the workpiece 91 by the laser machining device 1 or the laser machining method according to this embodiment.

As shown in FIG. 2, in a case where the pattern of a character string "1234", in which four characters are arranged in two rows and two columns, is marked in the workpiece 91, as shown in FIG. 3, a whole machining pattern to be formed in the workpiece 91 by the laser machining device 1 is constituted by four basic machining patterns, and each basic machining pattern is one in which a plurality of condensing points is discretely arranged.

Figure 4A:
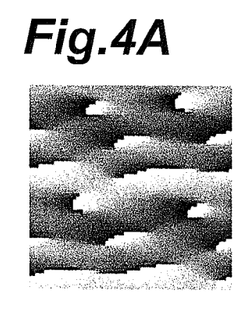
FIGS. 4A-4H is a view showing an example of a basic hologram or the like used in the workpiece 91 by the laser machining device 1 or laser machining method according to this embodiment.
Figure 4B:
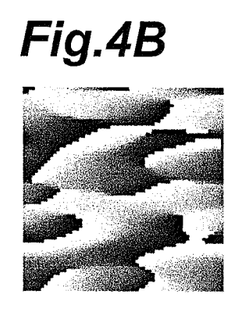
Figure 4C:
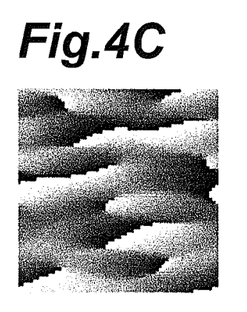
Figure 4D:
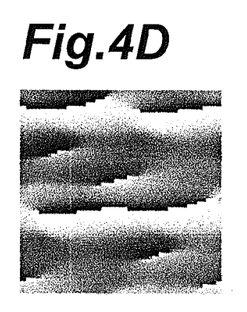
Figure 4E:
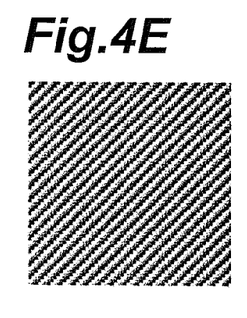
Figure 4F:
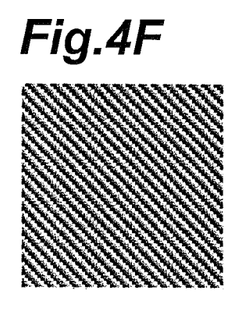
Figure 4G:
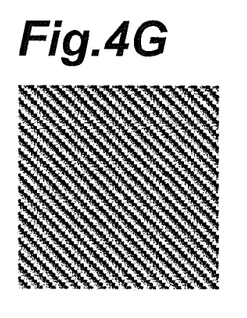
Figure 4H:
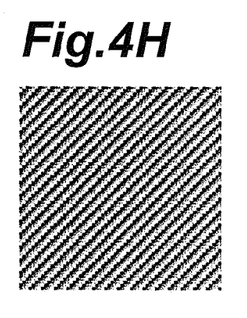

In order to form a whole machining pattern as shown in FIG. 3 in the workpiece 91, a whole hologram is configured on the basis of a basic hologram corresponding to a basic machining pattern "1" (FIG. 4A), a basic hologram corresponding to a basic machining pattern "2" (FIG. 4B), a basic hologram corresponding to a basic machining pattern "3" (FIG. 4C), a basic hologram corresponding to a basic machining pattern "4" (FIG. 4D), a blazed grating for forming the basic machining pattern "1" in an upper left position (FIG. 4E), a blazed grating for forming the basic machining pattern "2" in an upper right position (FIG. 4F), a blazed grating for forming the basic machining pattern "3" in an lower left position (FIG. 4G), and a blazed grating for forming the basic machining pattern "4" in an lower right position (FIG. 4H).

Figure 5A:
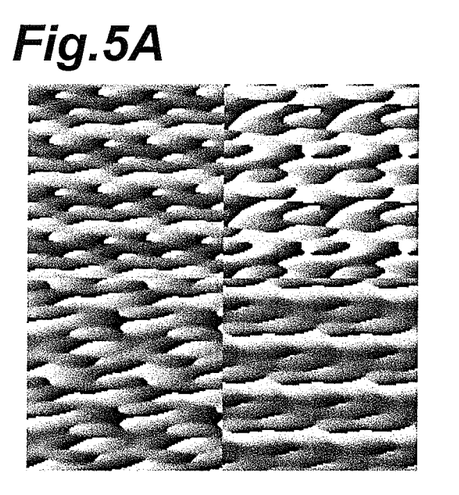
FIGS. 5A and 5B is a view showing an example of the whole hologram used in the workpiece 91 by the laser machining device 1 or laser machining method according to this embodiment.
Figure 5B:
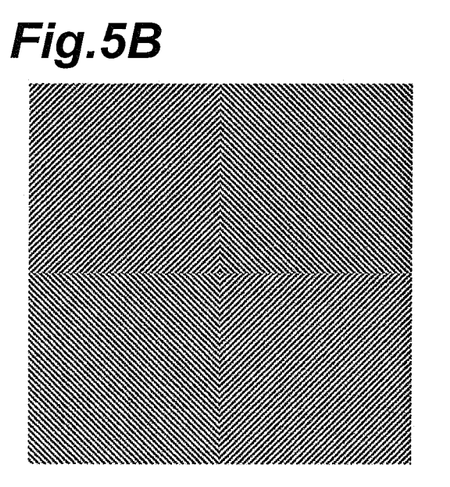

FIG. 5A shows the respective basic holograms of FIGS. 4A to 4D which are two-dimensionally arranged. Additionally, FIG. 5B shows the respective blazed gratings of FIGS. 4E to 4H which are two-dimensionally arranged. A whole hologram is obtained by superimposing the two-dimensionally arranged blazed gratings of FIG. 5B on the two-dimensional arranged basic holograms of FIG. 5A.

In the whole hologram obtained in this way, the whole hologram is equally divided into four with two straight lines passing the central point in the vertical and horizontal directions as boundaries, the basic hologram corresponding to the basic machining pattern "1" is arranged in an upper left display region, the basic hologram corresponding to the basic machining pattern "2" is arranged in an upper right display region, the basic hologram corresponding to the basic machining pattern "3" is arranged in a lower left display region, and the basic hologram corresponding to the basic machining pattern "4" is arranged in a lower right display region.

When such a whole hologram is displayed to the spatial light modulator 20, a laser beam incident on the spatial light modulator 20 is phase-modulated for each pixel, the laser beam after the phase modulation is radiated onto the workpiece 91 through the condensing optical system 30, and the whole machining pattern (FIG. 3), which is configured such that the four basic machining patterns "1", "2", "3", and "4" are arranged in two rows and two columns, is generated in the workpiece 91.

Meanwhile, in the workpiece 91 of this example, as shown in FIG. 3, the number of condensing points of the basic machining pattern "1" is eight, the number of condensing points of the basic machining pattern "2" is eight, the number of condensing points of the basic machining pattern "3" is seven, and the number of condensing points of the basic machining pattern "4" is seven, and the numbers n of the condensing points of these respective four basic machining patterns become relatively near values. Supposing the intensities I of laser beams input to the display regions of the respective basic holograms in the spatial light modulator 20 are equal to each other, and the diffraction efficiencies $\eta$ of the laser beams in the respective basic holograms are equal to each other, the amounts of light condensed on the condensing points of the respective four basic machining patterns in the workpiece 91 are approximately constant. Thus, the machining depths in the respective four basic machining patterns are almost the same.

Generally, as the number n of condensing points in a basic machining pattern becomes smaller, the intensity I of a laser beam input to a display region of a basic hologram corresponding to the basic machining pattern becomes stronger, and as the diffraction efficiency η of the laser beam in the basic hologram corresponding to this basic machining pattern becomes higher, the machining depth in this basic machining pattern becomes larger.

Generally, according to the basic machining pattern, the number n of condensing points varies, the intensity I of the laser beam input to the display region of the basic hologram also varies, and the diffraction efficiency η of the laser beam in the basic hologram also varies. Accordingly, the machining depth in the basic machining pattern also varies. For this reason, the machining depth varies according to basic machining patterns included in the whole machining pattern in the workpiece 91, and even if the machining depth is proper for a certain basic machining pattern, the machining depth may become too large or too small for other basic machining patterns. Therefore, the quality of machining to the workpiece 91 according to the whole machining pattern may be bad.

The intensity I of a laser beam input to a display region of a basic hologram is as follows. Generally, the intensity distribution in a beam cross-section of a laser beam output from the laser light source 10 and input to the spatial light modulator 20 through the spatial filter 11, the collimating lens 12, and the like becomes a Gaussian distribution. Accordingly, if the areas and shapes of the display regions of the basic holograms are the same, the intensities I of laser beams input to the display regions of the basic holograms become stronger as the basic holograms move closer to the center position of the Gaussian distribution. Additionally, if the distances from the center position of the Gaussian distribution to the display regions of the basic holograms are the same, the intensities I of the laser beams input to the display regions of the basic holograms become stronger as the areas of the display regions become larger.

Figure 6:
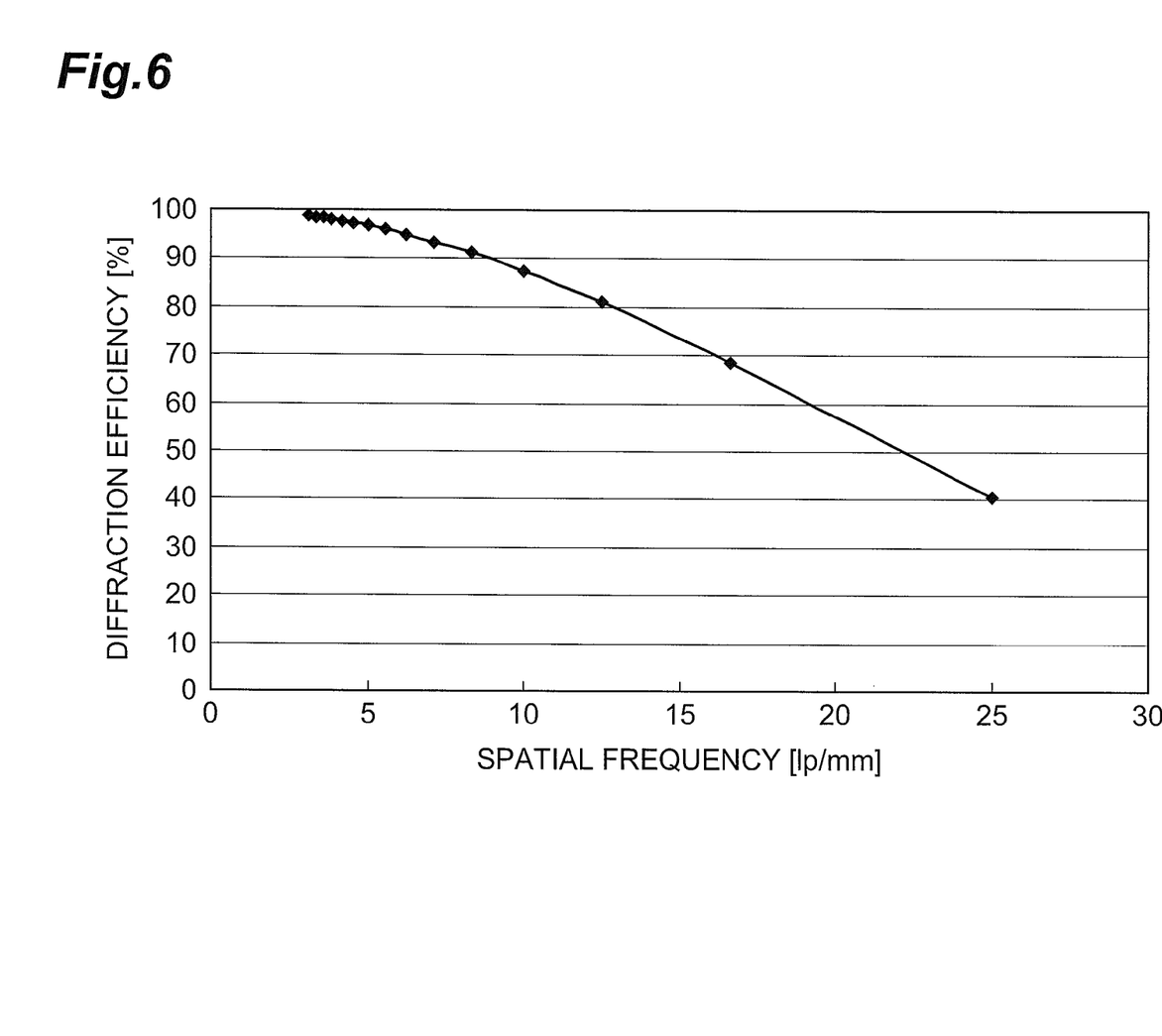
FIG. 6 is a graph showing the relationship between the spatial frequency of a grating and the theoretical value of diffraction efficiency.

The diffraction efficiency η of a laser beam in a basic hologram is as follows. FIG. 6 is a graph showing the relationship between the spatial frequency of a grating and the theoretical value of diffraction efficiency. As shown in this drawing, the diffraction efficiency is lowered as the spatial frequency of a grating becomes larger. For example, the pixel pitch of the spatial light modulator 20 is supposed to be 20 μm. In the case of a grating constituted by binaries, the spatial frequency becomes 25 $mm^{-1}$ (=1/(2×20 μm)), and the theoretical value of the diffraction efficiency becomes 40.5% at this time. Additionally, in the case of a grating constituted by quaternaries, the spatial frequency becomes 12.5 $mm^{-1}$ (=1/(4×20 μm)), and the theoretical value of the diffraction efficiency becomes 81% at this time. While, the diffraction angle becomes larger as the spatial frequency of a grating becomes larger. Accordingly, according to the position (that is, diffraction angle) of a basic machining pattern in a workpiece 91, the diffraction efficiency η of a laser beam in a basic hologram corresponding to this basic machining pattern varies.

Thus, for each basic hologram included in a whole hologram, the laser machining method according to this embodiment or the laser machining device 1 according to this embodiment determines the display region of each basic hologram in the spatial light modulator 20 so that the deviation of the value of "Iη/n" becomes small. For example, if the numbers n of condensing points in respective basic machining patterns are supposed to be the same, for a basic hologram of which the diffraction efficiency η of a laser beam is small, the position or size of a display region thereof is set so that the intensity I of a laser beam input to the display region becomes large. On the contrary, for a basic hologram of which the diffraction efficiency η of a laser beam is large, the position or size of a display region thereof is set so that the intensity I of a laser beam input to the display region becomes small.

For example, for the respective basic holograms included in a whole hologram, if the values of ratios "η/n" are the same, the arrangement of display regions of the respective basic holograms may be the one shown in FIG. 5. Additionally, the arrangement of the display regions of the respective basic holograms included in a whole hologram may be the one shown in FIG. 7 or 8.

Figure 7:
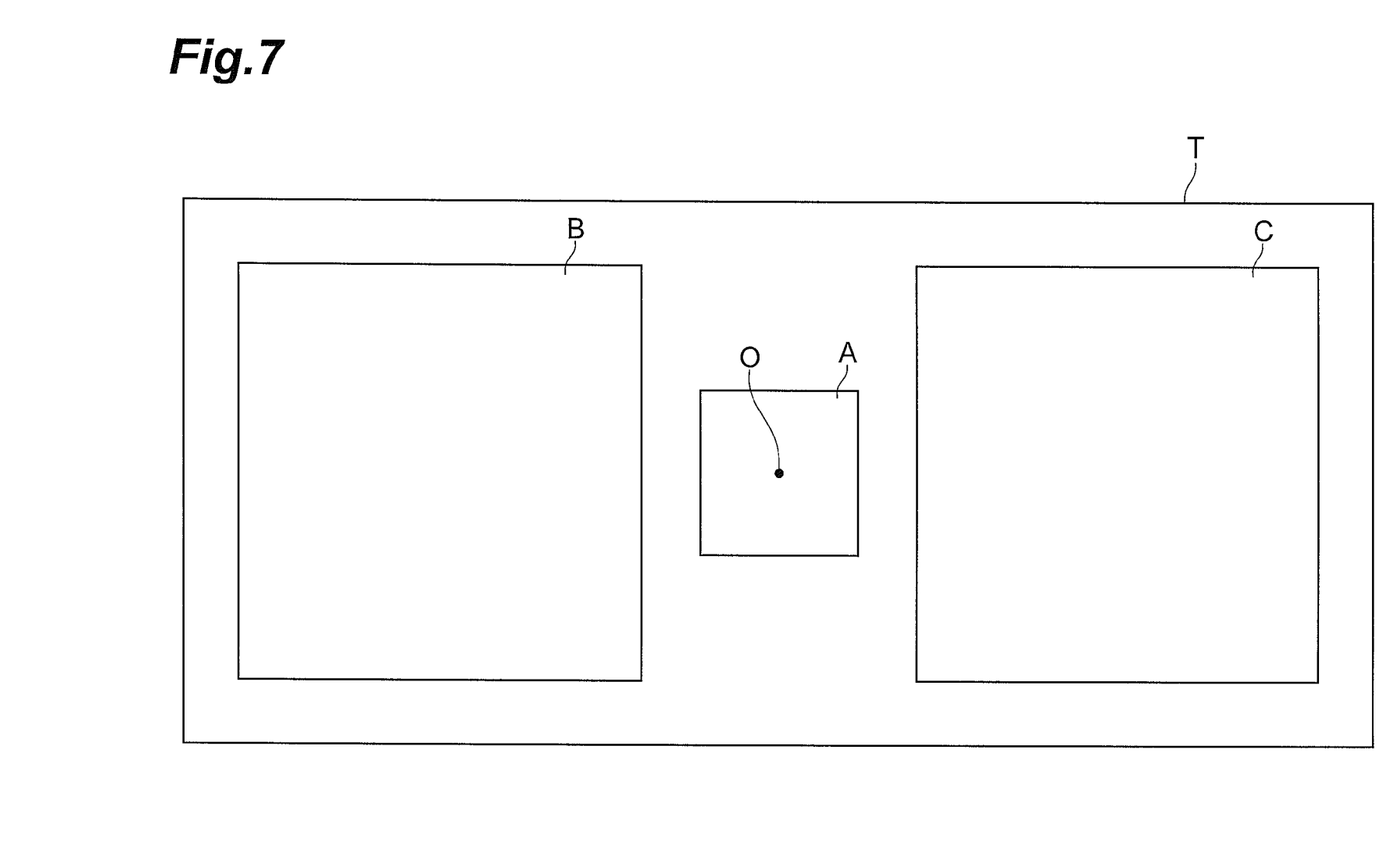
FIG. 7 is a view showing an example of the whole hologram used in the workpiece 91 by the laser machining device 1 or laser machining method according to this embodiment.

In the example shown in FIG. 7, among the basic holograms A to C included in a whole hologram T, a basic hologram A is displayed to a rectangular display region including a center position O, having largest laser beam intensity, and having relatively small area, and each of basic holograms B and C is displayed to a rectangular display region distant from the center position O, having relatively small laser beam intensity, and relatively large area.

Figure 8:
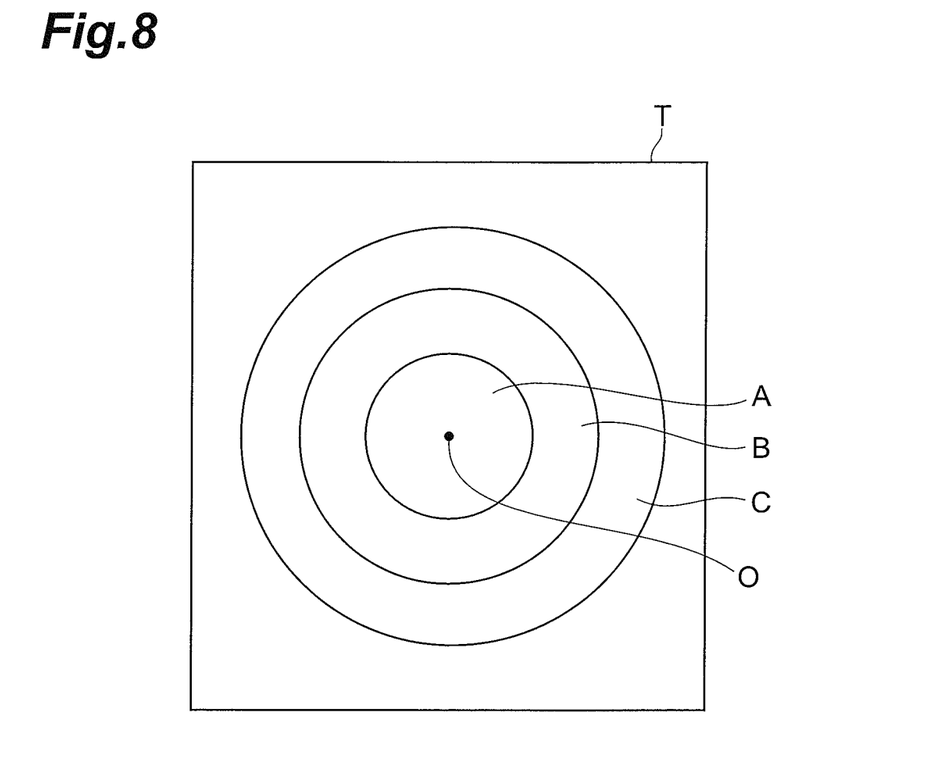
FIG. 8 is a view showing an example of a whole hologram used in the workpiece 91 by the laser machining device 1 or laser machining method according to this embodiment.

In the example shown in FIG. 8, among the basic hologram A to C included in a whole hologram T, a basic hologram A is displayed to a circular display region including a center position O and having largest laser beam intensity, the basic hologram B is displayed to an annular display region around the circular display region of the basic hologram A, and a basic hologram C is displayed to an annular display region around the annular display region of the basic hologram B.

In any example of FIGS. 7 and 8, the position or size of a display region of each basic hologram in the spatial light modulator 20 is set so that the deviation of the value of "Iη/n" of each of the basic holograms A to C included in the whole hologram T becomes small.

Figure 9:
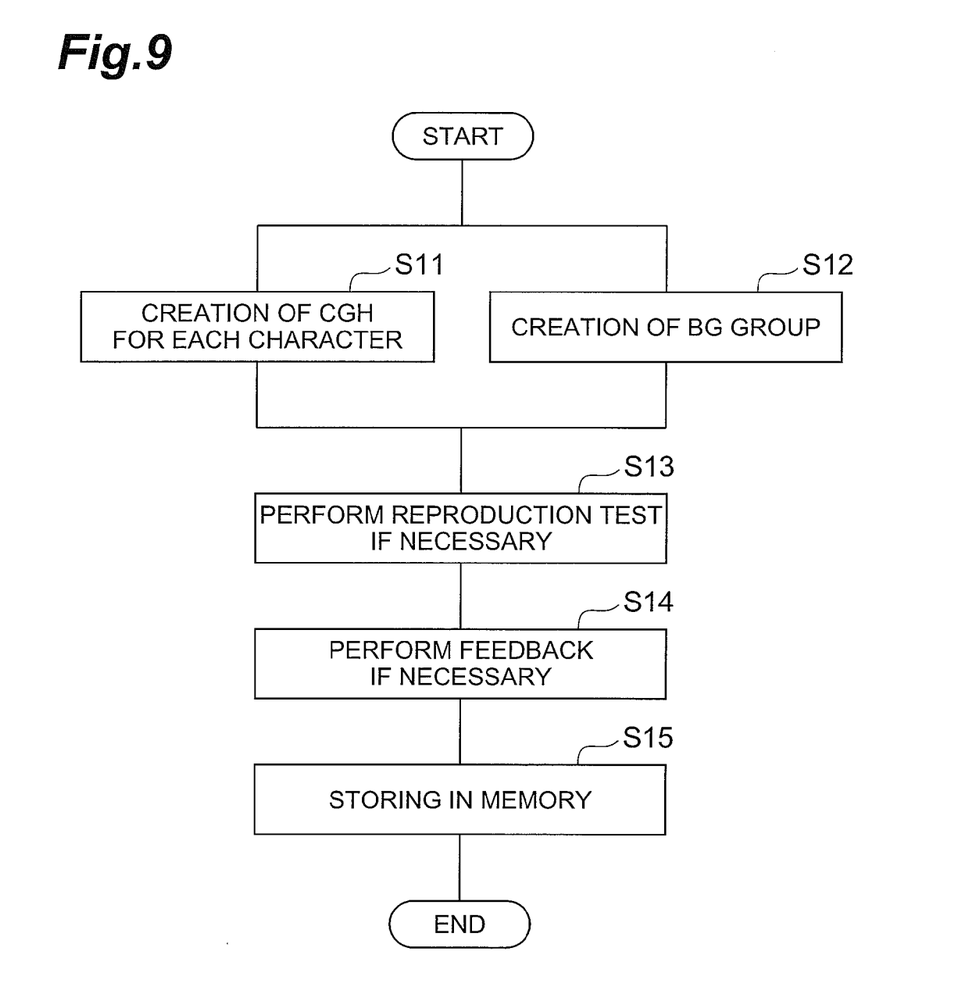
FIG. 9 is a flow chart illustrating a method of creating a basic hologram in the laser machining device 1 or laser machining method according to this embodiment.

A method of creating a basic hologram is as follows. FIG. 9 is a flow chart illustrating a method of creating a basic hologram in the laser machining device 1 or laser machining method according to this embodiment. In order to create a basic hologram, first, a basic hologram (CGH) is generated in correspondence with each of a plurality of basic machining patterns which can constitute various whole machining patterns to be machined (marked) in the workpiece 91 (Step S11). An algorithm of a GS method or an ORA method is used when the basic hologram (CGH) is generated. Additionally, a blazed grating (BG) is generated according to the position of each basic machining pattern included in a whole machining pattern in a workpiece 91 (Step S12).

When the basic hologram (CGH) is generated by the GS method algorithm, a random phase is used as the initial phase. However, the performance of the basic hologram (CGH) created may significantly deteriorate depending on this random phase. Additionally, there may be an error in the actual optical system depending on the simulation conditions. Then, if necessary, feedback is produced from the difference between a simulation result and a reproduction test result, and re-creation of the basic hologram (CGH) is performed (Steps S13 and S14). Then, after these steps, the basic hologram (CGH) and the blazed grating (BG) are stored in the storage unit 21A (Step S15).

Figure 10:
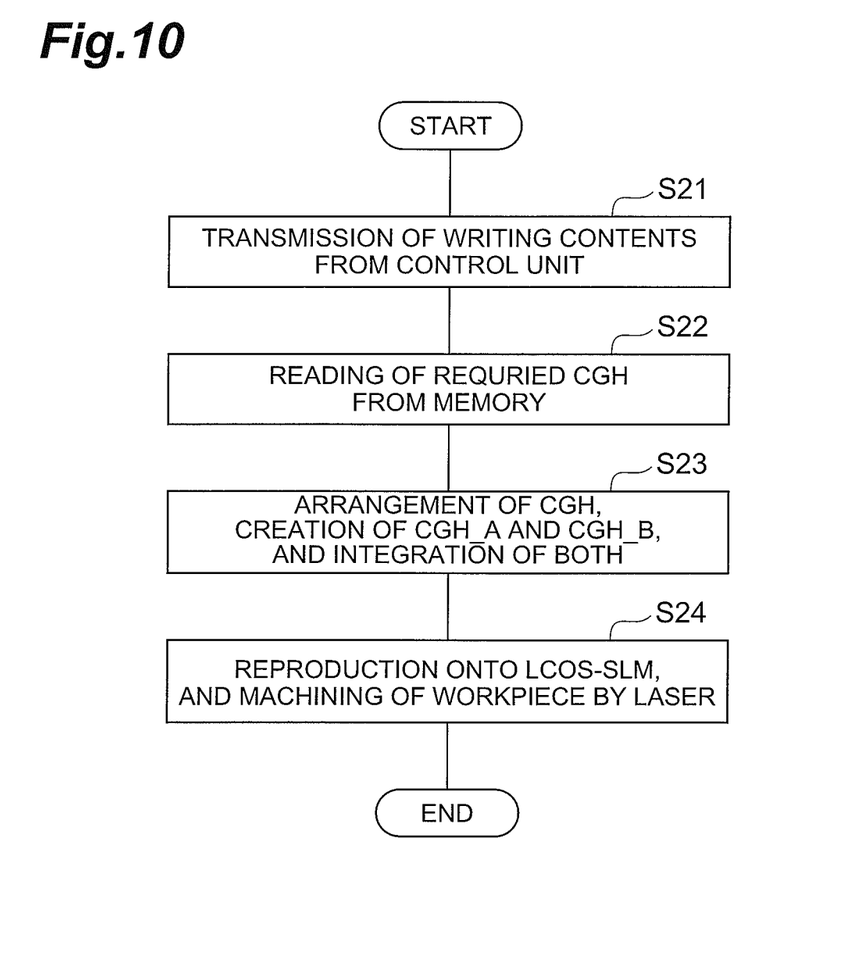
FIG. 10 is a flow chart illustrating a method of creating a whole hologram in the laser machining device 1 or laser machining method according to this embodiment.

A method of creating a whole hologram is as follows. FIG. 10 is a flow chart illustrating a method of creating a whole hologram in the laser machining device 1 or laser machining method according to this embodiment. In order to create a whole hologram, first, a signal including information on a basic machining pattern which constitutes the whole machining pattern to be written in a workpiece 91 is transmitted to the driving unit 21 from the control unit 22, for example, in a text format (Step S21). When this information is received by the driving unit 21, the driving unit 21 reads some basic holograms (CGH) and blazed gratings (BS) for reproducing the required basic machining pattern from the storage unit 21A (Step S22).

From the some basic holograms (CGH) which have been read, a hologram (CGH_A) in which the basic holograms as shown in FIG. 5A are two-dimensionally arranged is generated, and a hologram (CGH_B) in which the blazed gratings (BS) as shown in FIG. 5B are two-dimensionally arranged is generated, and these holograms CGH_A and CGH_B are integrated to create a whole hologram (Step S23). Thus, for each basic hologram included in the whole hologram, the display region of each basic hologram in the spatial light modulator 20 is determined so that the deviation of the value of "Iη/n" becomes small. Then, the spatial light modulator 20 is made to display the whole hologram created in this way, a laser beam output from the laser light source 10 is phase-modulated for each pixel, and the workpiece 91 is machined in the desired whole machining pattern through the condensing optical system 30 (Step S24).

As described above, in this embodiment, a plurality of basic holograms are created in advance and stored in correspondence to basic machining patterns (for example, alphanumeric characters), respectively, some of the basic holograms are combined to configure a whole hologram, the spatial light modulator 20 is made to display the configured whole hologram, and a laser beam is phase-modulated for each pixel by the spatial light modulator 20 to generate a whole machining pattern (for example, a character string composed of a plurality of alphanumeric characters) constituted by some basic machining patterns in the workpiece 91. For this reason, since repeated processing for creation of a hologram becomes unnecessary, the laser machining throughput can be improved.

Additionally, in this embodiment, as for each basic hologram included in the whole hologram, the display region of each basic hologram in the spatial light modulator 20 is determined so that the deviation of the value of "Iη/n" becomes small. Thus, since the machining depths depending on respective basic machining patterns included in the whole machining pattern in the workpiece 91 can be made almost the same, it becomes possible to raise the quality of laser machining on the workpiece 91.

The invention is not limited to the above embodiment, and various modifications thereof can be made. For example, a storage unit which stores the basic holograms (CGH) and the blazed gratings (BS) may be provided in the driving unit 21 as in the above embodiment, or may be provided in the control unit 22.

What is claimed is:

1. A light radiating device which radiates a modulated light of a whole pattern including two or more basic patterns onto an object collectively, the light radiating device comprising:
   a light source which outputs a light;
   a phase-modulation type spatial light modulator which inputs the light output from the light source, displays a whole hologram which modulates the phase of the light in each of a plurality of pixels which is two-dimensionally arrayed, and outputs the modulated light after the phase modulation;
   a condensing optical system which inputs the modulated light output from the spatial light modulator, and images the modulated light in the object; and
   a control unit which configures a whole hologram on the basis of a plurality of basic holograms, and causes the spatial light modulator to display the configured whole hologram,
   wherein the control unit is further configured to determine a position and a size of a display region of each basic hologram in the spatial light modulator on the basis of an intensity of a light input to a display region of the basic hologram in the spatial light modulator I, the diffraction efficiency of the light in the basic hologram η, and the number of condensing points in a basic pattern corresponding to the basic hologram n.

2. The light radiating device according to claim 1, wherein the control unit is configured to determine the position and the size of the display region of each basic hologram in the spatial light modulator so that the deviation of the value of "Iη/n" is reduced as compared to other positions and sizes of respective display regions in the spatial light modulator.

3. The light radiating device according to claim 1, wherein the control unit is configured to set a size of a display region on the basis of the intensity I, the diffraction efficiency η and the number of condensing points n.

4. The light radiating device according to claim 1, wherein the control unit is configured to set a position of a display region on the basis of the intensity I, the diffraction efficiency η and the number of condensing points n.

5. The light radiating device according to claim 1, wherein each basic hologram included in the whole hologram is displayed to a circular display region.

6. The light radiating device according to claim 1, further comprising a storage unit which is configured to store a plurality of basic holograms to be displayed to the spatial light modulator in correspondence with a plurality of basic patterns, respectively.

7. The light radiating device according to claim 1, wherein the control unit is configured to superimpose a grating on each basic hologram to configure the whole hologram so that the condensing optical system images the modulated light on an imaging area of a corresponding basic pattern in the object from the display region of each basic hologram in the spatial light modulator.

8. The light radiating device according to claim 1, wherein the light source is a laser light source.

9. The light radiating device according to claim 1, further comprising a conveyor belt on which the light radiating device and the object are provided.

10. The light radiating device according to claim 5, wherein the control unit is configured to select a plurality of basic holograms corresponding to each basic pattern included in the whole pattern from the plurality of basic holograms stored by the storage unit.

11. A light radiating method which radiates a modulated light of a whole pattern including two or more basic patterns onto an object collectively, the light radiating method comprising:
   using a light radiating device including:
   a light source which outputs a light;
   a phase-modulation type spatial light modulator which inputs the light output from the light source, displays a whole hologram which modulates the phase of the light in each of a plurality of pixels which is two-dimensionally arrayed, and outputs the modulated light after the phase modulation;
   a condensing optical system which inputs the modulated light output from the spatial light modulator, and images the modulated light in the object; and a control unit which configures a whole hologram on the basis of a plurality of basic holograms, causes the spatial light modulator to display the configured whole hologram, and determines a position and a size of a display region of each basic hologram in the spatial light modulator on the basis of an intensity of a light input to a display region of the basic hologram in the spatial light modulator I, the diffraction efficiency of the light in the basic hologram η, and the number of condensing points in a basic pattern corresponding to the basic hologram n.

12. The light radiating method according to claim 11, further comprising determining a display region of each basic hologram in the spatial light modulator so that the deviation of the value of "Iη/n" is reduced as compared to other positions and sites of respective display regions in the spatial light modulator.

13. The light radiating method according to claim 11, further comprising setting a size of a display region on the basis of the intensity I, the diffraction efficiency η and the number of condensing points n.

14. The light radiating method according to claim 11, further comprising setting a position of a display region on the basis of the intensity I, the diffraction efficiency η and the number of condensing points n.

15. The light radiating method according to claim 11, further comprising displaying each basic hologram included in the whole hologram to a circular display region.

16. The light radiating method according to claim 11, further comprising storing a plurality of basic holograms to be displayed to the spatial light modulator in correspondence with a plurality of basic patterns, respectively.

17. The light radiating method according to claim 11, further comprising selecting a plurality of basic holograms corresponding to each basic pattern included in the whole pattern from the plurality of basic holograms stored by the storage unit.

18. The light radiating method according to claim 11, further comprising superimposing a grating on each basic hologram to configure the whole hologram so that the condensing optical system images the modulated light on an imaging area of a corresponding basic pattern in the object from the display region of each basic hologram in the spatial light modulator.

19. The light radiating method according to claim 11, wherein the light source is a laser light source.

20. The light radiating method according to claim 11, further comprising providing a conveyor belt on which the light radiating device and the object are provided.

* * * * *